United States Patent
Fu et al.

(10) Patent No.: US 12,031,630 B2
(45) Date of Patent: Jul. 9, 2024

(54) RING SEAL AND A ROBOT

(71) Applicant: ABB Schweiz AG, Baden (CH)

(72) Inventors: Xinguo Fu, Shanghai (CN); Tao Feng, Shanghai (CN); Gongyao Ma, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/318,445

(22) Filed: May 12, 2021

(65) Prior Publication Data

US 2021/0356042 A1 Nov. 18, 2021

(30) Foreign Application Priority Data

May 14, 2020 (CN) .......................... 202010408965.X

(51) Int. Cl.
*F16J 15/32* (2016.01)

(52) U.S. Cl.
CPC ...................... *F16J 15/32* (2013.01)

(58) Field of Classification Search
CPC ....... F16J 15/32; F16J 15/3204; F16J 15/3268
See application file for complete search history.

(56) References Cited

U.S. PATENT DOCUMENTS

| | | | |
|---|---|---|---|
| 2,832,223 A * | 4/1958 | Couraud | F16J 15/48 403/50 |
| 4,103,909 A * | 8/1978 | Hoffman | F16J 15/3236 277/530 |
| 4,697,978 A | 10/1987 | Tada et al. | |
| 4,898,394 A * | 2/1990 | Voitik | F16J 15/32 277/925 |
| 5,031,923 A | 7/1991 | Davies | |
| 5,553,872 A * | 9/1996 | Gies | F16J 15/56 277/560 |
| 5,564,714 A * | 10/1996 | Katsuno | B29C 37/02 277/924 |
| 5,577,314 A * | 11/1996 | Katsuno | B25B 27/28 29/451 |
| 5,733,493 A * | 3/1998 | Katsuno | B26F 1/3846 264/255 |

(Continued)

FOREIGN PATENT DOCUMENTS

| | | |
|---|---|---|
| CN | 105299230 A | 2/2016 |
| CN | 205013655 U | 2/2016 |

(Continued)

OTHER PUBLICATIONS

Machine Translation of EP 2012051 A1, pp. 1-4 (Year: 2023).*

(Continued)

*Primary Examiner* — Eugene G Byrd
*Assistant Examiner* — L. Susmitha Koneru
(74) *Attorney, Agent, or Firm* — Leydig, Voit & Mayer, Ltd.

(57) ABSTRACT

A ring seal and a robot. The ring seal includes an outer circumferential wall and an annular portion. The outer circumferential wall extends in an axial direction of the ring seal. The annular portion extends from a side of the outer circumferential wall toward an interior of the outer circumferential wall in a radial direction of the ring seal. As viewed in a cross section taken along the radial direction, the annular portion and the outer circumferential wall form an L shape.

6 Claims, 7 Drawing Sheets

(56) References Cited

U.S. PATENT DOCUMENTS

| | | | | |
|---|---|---|---|---|
| 6,334,615 | B1* | 1/2002 | Uchiyama | B29C 45/1676 |
| | | | | 277/944 |
| 7,758,052 | B2* | 7/2010 | Roberts | F16J 15/545 |
| | | | | 277/491 |
| 8,608,856 | B2* | 12/2013 | Hayashi | H01L 21/67126 |
| | | | | 277/944 |
| 9,077,010 | B2* | 7/2015 | Ueda | H01M 8/0273 |
| 2008/0067753 | A1* | 3/2008 | Roberts | F15B 15/1452 |
| | | | | 277/434 |
| 2011/0253514 | A1* | 10/2011 | Sun | F16C 33/7886 |
| | | | | 198/842 |
| 2013/0307227 | A1* | 11/2013 | Ueda | F16J 15/106 |
| | | | | 277/648 |
| 2014/0333036 | A1* | 11/2014 | Kullen | F16J 15/0825 |
| | | | | 277/627 |
| 2014/0339779 | A1* | 11/2014 | Kodama | F16J 15/16 |
| | | | | 277/572 |
| 2015/0267817 | A1* | 9/2015 | Fujii | F16J 15/3268 |
| | | | | 277/572 |
| 2016/0084690 | A1* | 3/2016 | Smith | F16J 15/3236 |
| | | | | 73/861.12 |
| 2018/0119582 | A1* | 5/2018 | Buuck | F01L 5/16 |

FOREIGN PATENT DOCUMENTS

| | | | | |
|---|---|---|---|---|
| CN | 109114202 A | | 1/2019 | |
| CN | 109361290 A | | 2/2019 | |
| CN | 110043668 A | | 7/2019 | |
| CN | 212480126 U | | 2/2021 | |
| CN | 111409099 B | * | 11/2021 | B25J 17/0258 |
| EP | 2012051 A1 | * | 1/2009 | F16J 15/002 |
| EP | 2138746 A1 | * | 12/2009 | F16J 15/121 |
| EP | 2138746 A1 | | 12/2009 | |
| GB | 774221 A | | 5/1957 | |
| JP | S62-173192 A | | 7/1987 | |
| JP | 2011-089609 A | | 5/2011 | |

OTHER PUBLICATIONS

European Patent Office, European Search Report in European Patent Application No. 21173480, (dated Oct. 26, 2021).

The Patent Office of the People's Republic of China, Office Action in Chinese Patent Application No. 202010408965X, 12 pp. (dated May 7, 2022).

Chinese Patent Office, Office Action in Chinese Patent Application No. 202010408965.X, 14 pp. (dated Aug. 15, 2022).

* cited by examiner

RING SEAL AND A ROBOT

CROSS-REFERENCE TO RELATED APPLICATIONS

This patent application claims priority from Chinese Patent Application No. 202010408965.X, filed May 14, 2021, which is fully incorporated herein by reference for all purposes.

FIELD

Embodiments of the present disclosure generally relate to a field of industrial robots, and more specifically to robots using a labyrinth seal.

BACKGROUND

Industrial robots are applied widely, for example, they may be used to grab workpieces on a production line. A large amount of lubricating oil is required during operation of the robots to ensure their normal operation. The lubricating oil occupies most of the space inside the robot. If the lubricating oil is not well controlled, seepage may result. A large amount of seepage not only leads to waste of lubricating oil, but also might bring about safety hazards. Even if the amount of seepage is not large, it will contaminate other components on the production line, which greatly affects the user experience.

Therefore, the robot has a high demand for sealing reliability. How to improve the internal sealing performance of the robot while ensuring the normal operation of the robot, thereby preventing the seepage of oil, remains a challenge to the designer.

In the prior art, a dual sealing structure may be used to improve the sealing effect inside the robot. However, the different sealing structures in this design have high requirements for the shaft of the robot, and are not only difficult to implement and but also costly.

SUMMARY

For example, Chinese patent application CN 109361290A discloses the known technology of an anti-oil contamination solution in the field of robots. This solution addresses the problem of oil contamination caused by lubricating oil seepage by disposing a coil sheath on a stator core and applying a curable glue. In this way, there are more processing steps and assembling is more troublesome. The scope of application of this anti-oil contamination solution is also greatly restricted.

Embodiments of the present disclosure provide a ring seal for a robot and a corresponding robot, which aim to at least partly solve the above and/or other potential problems existing in the design of robots.

In a first aspect, embodiments of the present disclosure relate to a ring seal. The ring seal comprises: an outer circumferential wall extending in an axial direction of the ring seal; an annular portion extending from a side of the outer circumferential wall towards an interior of the outer circumferential wall in a radial direction of the ring seal, wherein the annular portion and the outer circumferential wall form an L shape when viewed in a cross section taken along the radial direction.

According to embodiments of the present disclosure, the ring seal can prevent oil from seeping in multiple directions, thereby improving the sealing effect.

In some embodiments, the seal further comprises: an inner circumferential wall extending in the axial direction from an end of the annular portion away from the outer circumferential wall, wherein the inner circumferential wall, the outer circumferential wall and the annular portion form a U shape when viewed in a cross section taken along the radial direction.

In some embodiments, the outer circumferential wall comprises a first portion and a second portion arranged in the axial direction, the first portion is close to the annular portion and has a first thickness in the radial direction, the second portion has a second thickness in the radial direction, and the second thickness is greater than the first thickness so that a slope is formed on a radially inner side of the outer circumferential wall.

In some embodiments, the outer circumferential wall is provided with a circumferential groove extending in a circumferential direction on a side away from the annular portion.

In some embodiments, the ring seal is made of aluminum or steel.

In some embodiments, the outer circumferential wall extends by a first length in the axial direction, the inner circumferential wall extends by a second length in the axial direction, and the first length is greater than the second length.

In some embodiments, the annular portion is perpendicular to the outer circumferential wall.

In a second aspect, embodiments of the present disclosure comprises a robot. The robot comprises a gear box; and the ring seal described in the first aspect, the ring seal being disposed on a radially outer side of the gear box, wherein the outer circumferential wall of the ring seal is fixedly connected to an end of the gear box, and there is a gap disposed between the annular portion of the ring seal and the other end of the gear box in the radial direction.

BRIEF DESCRIPTION OF THE DRAWINGS

Through the following detailed description with reference to the accompanying drawings, the above and other objectives, features, and advantages of embodiments of the present disclosure will become easier to understand. In the accompanying drawings, a plurality of embodiments of the present disclosure will be described in an exemplary and non-limiting manner, wherein.

DETAILED DESCRIPTION OF EMBODIMENTS

Figure 1:
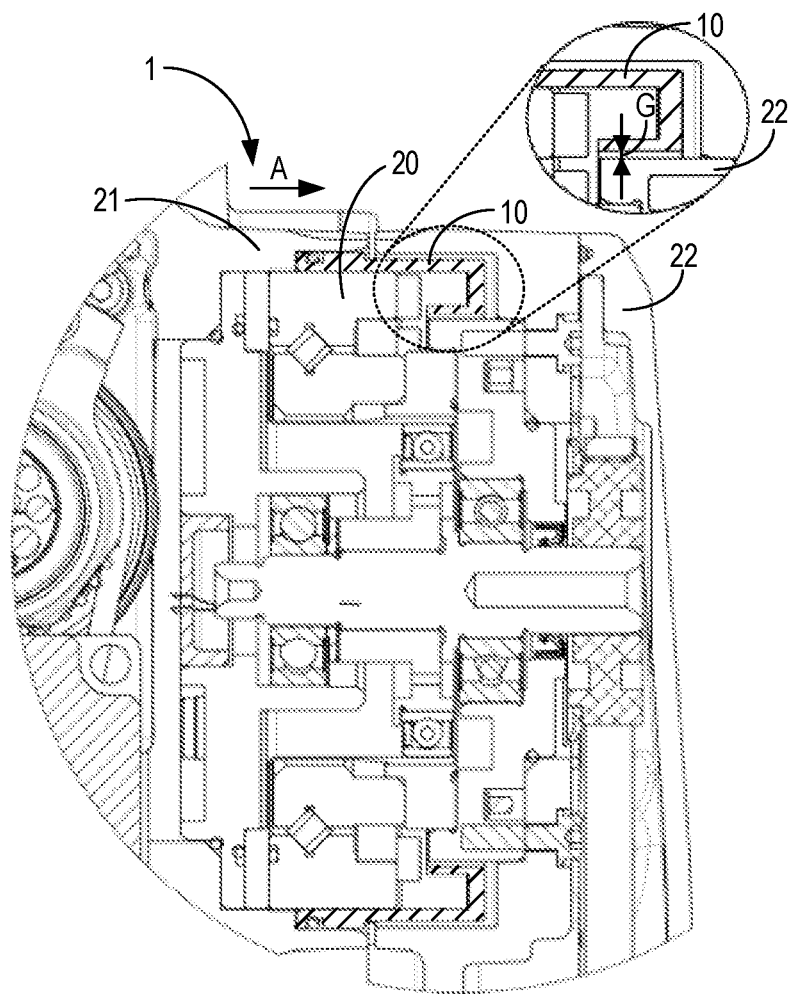
FIG. 1 shows a schematic cross-sectional view of a robot according to an embodiment of the present disclosure.

The principle of the present disclosure will now be described with reference to various embodiments in the drawings. It should be understood that these embodiments are only for the purpose of enabling those skilled in the art to better understand and thereby implement the present disclosure, and are not described for the purpose of placing any limitation on the scope of the present disclosure. It should be noted that similar or identical reference signs may be used in the drawings where feasible, and similar or identical reference signs may indicate similar or identical elements. Those skilled in the art will understand that alternative embodiments of the structures and methods described herein may be adopted without departing from the principles of the present disclosure described from the following description.

As mentioned above, in conventional robot designs, the lubricating oil might seep out of the robot, contaminate the worktable or other components and greatly affect the user' experience.

Some exemplary implementations according to embodiments of the present disclosure will be described hereinafter with reference to FIGS. 1-12, wherein FIGS. 1-4 show a schematic implementation according to an embodiment of the present disclosure, FIGS. 5-8 show a schematic implementation according to another embodiment of the present disclosure, and FIGS. 9-12 show a schematic implementation according to a further embodiment of the present disclosure.

Figure 4:
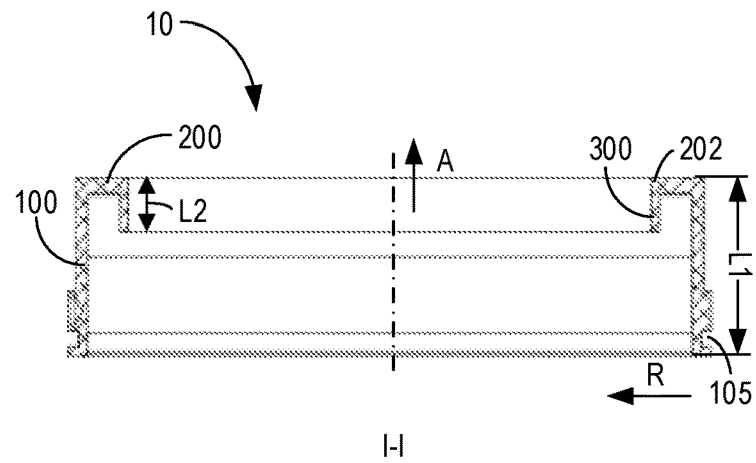
FIG. 4 shows a schematic cross-sectional view of the ring seal taken along the Line I-I in FIG. 3.
Figure 8:
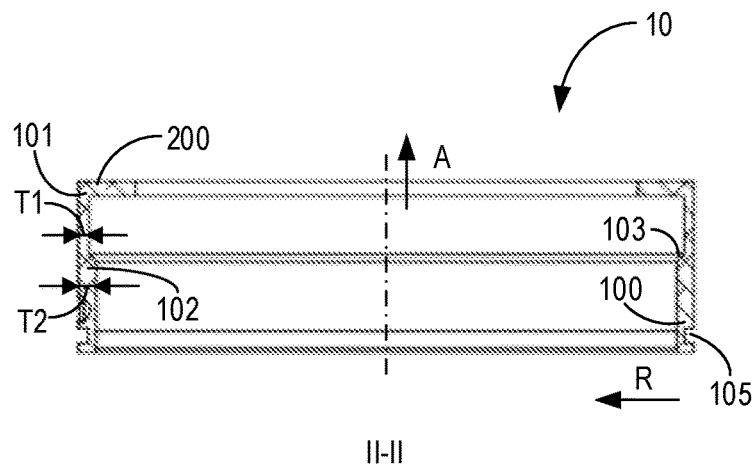
FIG. 8 shows a schematic cross-sectional view of the ring seal taken along the Line II-II in FIG. 7.
Figure 12:
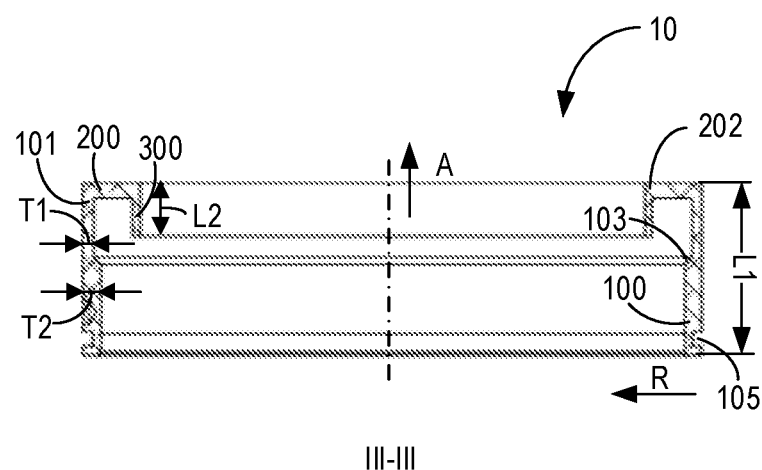
FIG. 12 shows a schematic cross-sectional view of the ring seal taken along Line III-III in FIG. 11.

As shown in FIG. 4, 8 or 12, the seal has an annular structure and defines an axial direction A and a radial direction R. The ring seal 10 generally includes an outer circumferential wall 100 and an annular portion 200. The outer circumferential wall 100 extends in the axial direction A of the ring seal 10. The annular portion 200 extends from one side of the outer circumferential wall 100 towards the interior of the outer circumferential wall 100 in the radial direction R of the ring seal 10. When viewed in a cross section taken along the radial direction R, referring to FIG. 8, the annular portion 200 and the outer circumferential wall 100 form an L shape.

According to the embodiments of the present disclosure, the ring seal 10 employs a labyrinth seal, and may effectively prevent the seepage of oil upon flowing through the ring seal 10, with a meandering path being disposed. When the ring seal 10 is mounted in the robot, seepage of lubricating oil in the robot can be prevented.

In some embodiments, referring to FIG. 4 or FIG. 12, the ring seal 10 may further include an inner circumferential wall 300. The inner circumferential wall 300 extends in the axial direction A from an end 202 of the annular portion 200 away from the outer circumferential wall 100, so that when viewed in a cross section taken along the radial direction R, the inner circumferential wall 300, the outer circumferential wall 100 and the annular portion 200 may form a U shape, which can be seen in FIG. 4 or FIG. 12.

Figure 9:
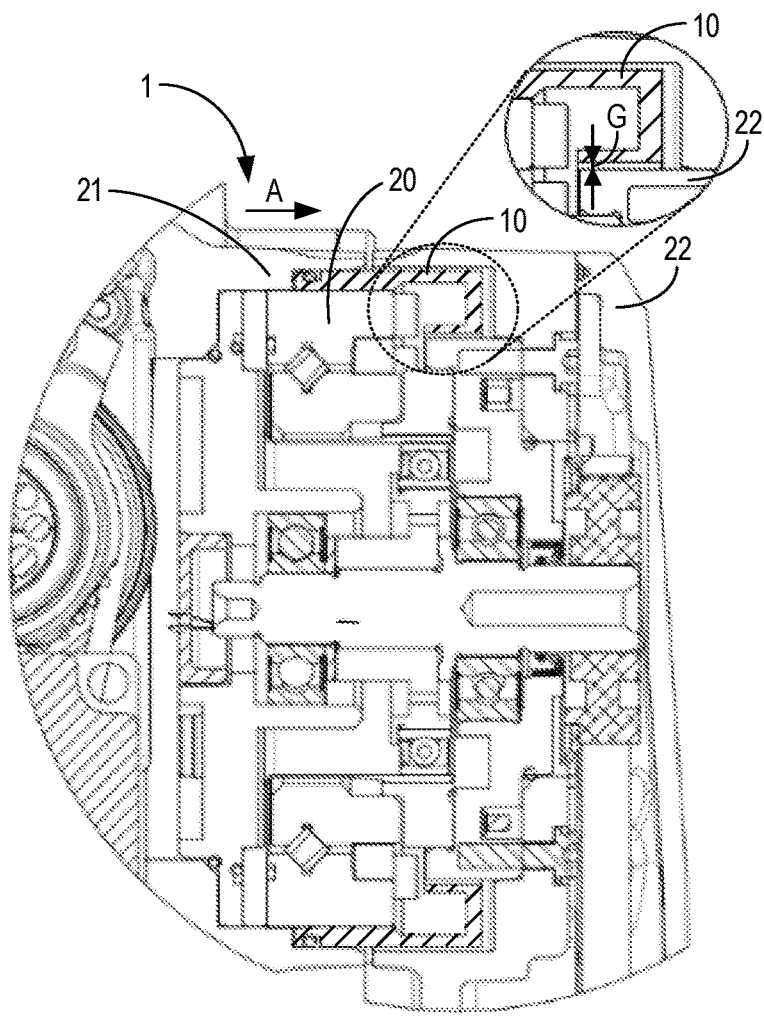
FIG. 9 shows a schematic cross-sectional view of a robot according to a further embodiment of the present disclosure.

With reference to FIG. 1 and FIG. 9, since the cross section of the ring seal 10 is U-shaped, this arrangement ensures that the ring seal 10 does not cause seepage in multiple directions. Therefore, whether the robot is mounted in an upright direction (i.e., in a mounting direction as shown in FIG. 1 or FIG. 9), mounted reversely (i.e., in a mounting direction obtained by rotating the direction shown in FIG. 1 or FIG. 9 by 180°) or mounted in an attachment manner (i.e., in a mounting direction obtained by rotating the direction shown in FIG. 1 or FIG. 9 by 90°), seepage will not occur in the interior of the robot. In this way, the ring seal 10 may be applicable for robots in various different usage environments.

In some embodiments, as shown in FIG. 8 or FIG. 12, the outer circumferential wall 100 may include two portions arranged in the axial direction A, namely, a first portion 101 and a second portion 102. As shown, the first portion 101 is close to the annular portion 200 and has a first thickness T1 in the radial direction R, and the second portion 102 has a second thickness T2 in the radial direction R. The second thickness T2 may be greater than the first thickness T1 so that a slope 103 is formed radially inside the outer circumferential wall 100.

Figure 5:
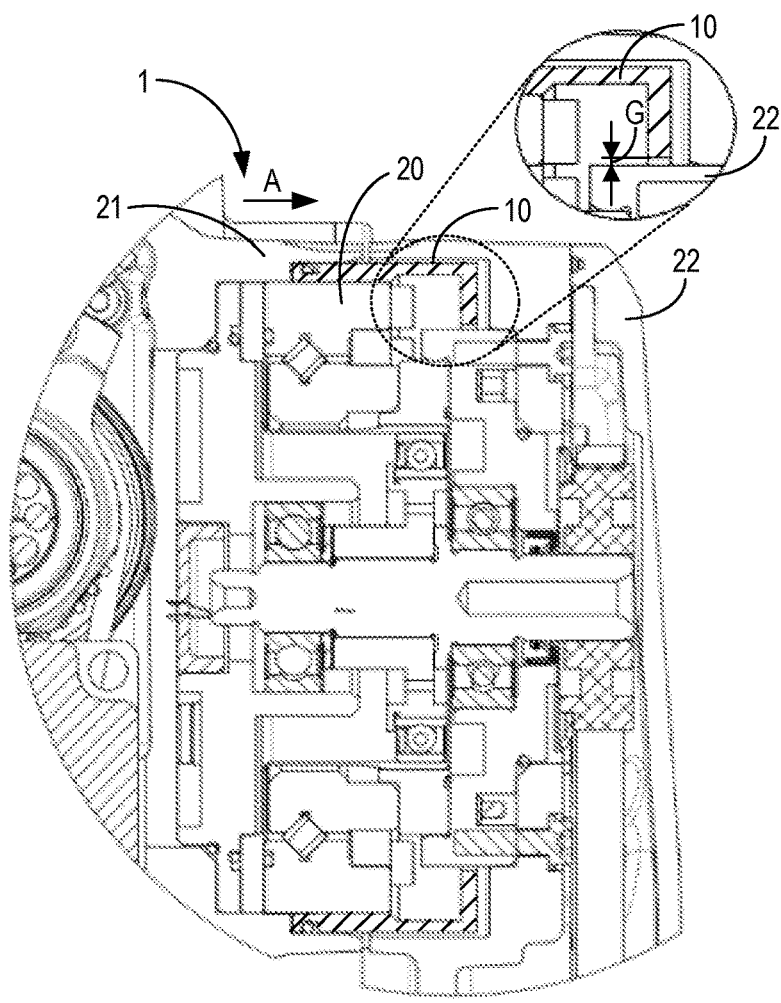
FIG. 5 shows a schematic cross-sectional view of a robot according to another embodiment of the present disclosure.

Referring to FIG. 5 or FIG. 9, the slope 103 may prevent oil from seeping in the axial direction A. In this way, the sealing effect may be further improved. In addition, since the first thickness T1 is set to be small, the ring seal 10 may be made thinner on the premise of meeting the sealing requirements, thereby saving the material, and controlling the manufacturing cost of the ring seal 10.

Figure 2:
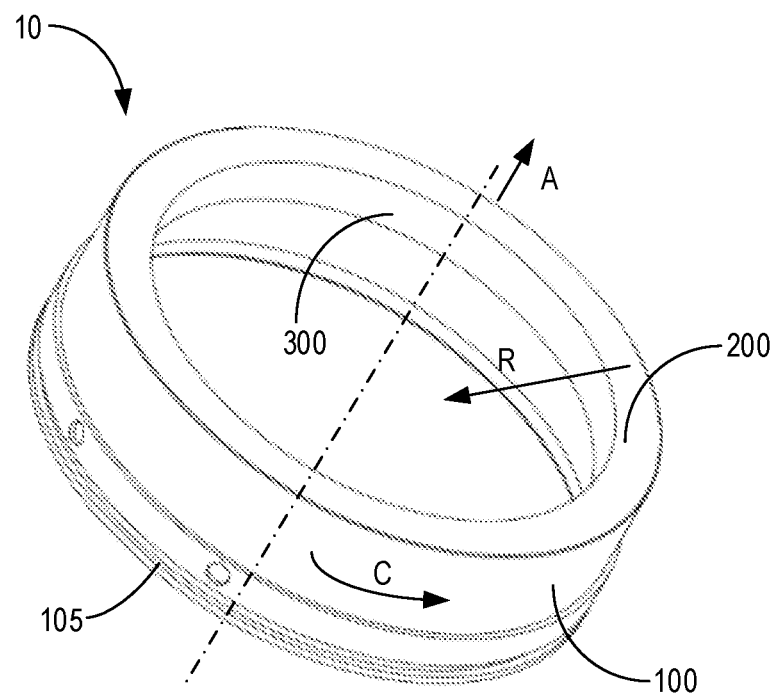
FIG. 2 shows a schematic perspective view of a ring seal of FIG. 1.
Figure 3:
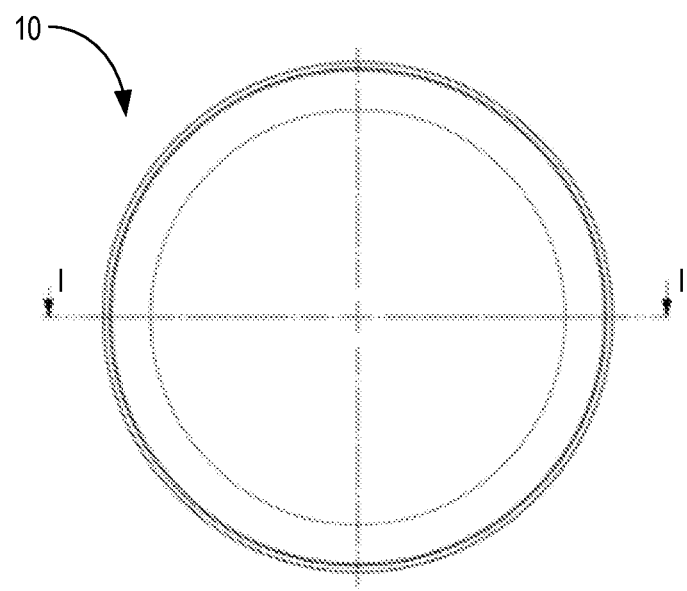
FIG. 3 shows a front view of the ring seal in FIG. 2.
Figure 6:
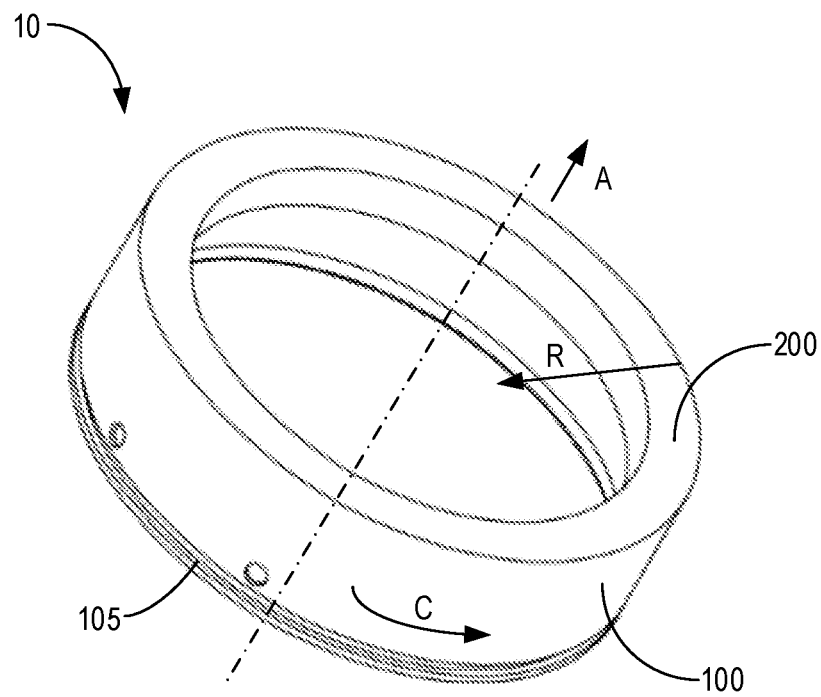
FIG. 6 shows a schematic perspective view of the ring seal according to FIG. 5.
Figure 7:
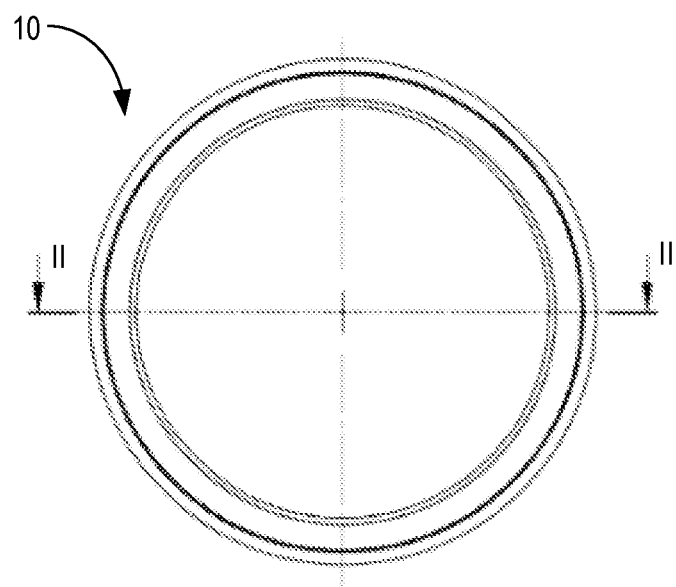
FIG. 7 shows a front view of the ring seal of FIG. 6.
Figure 10:
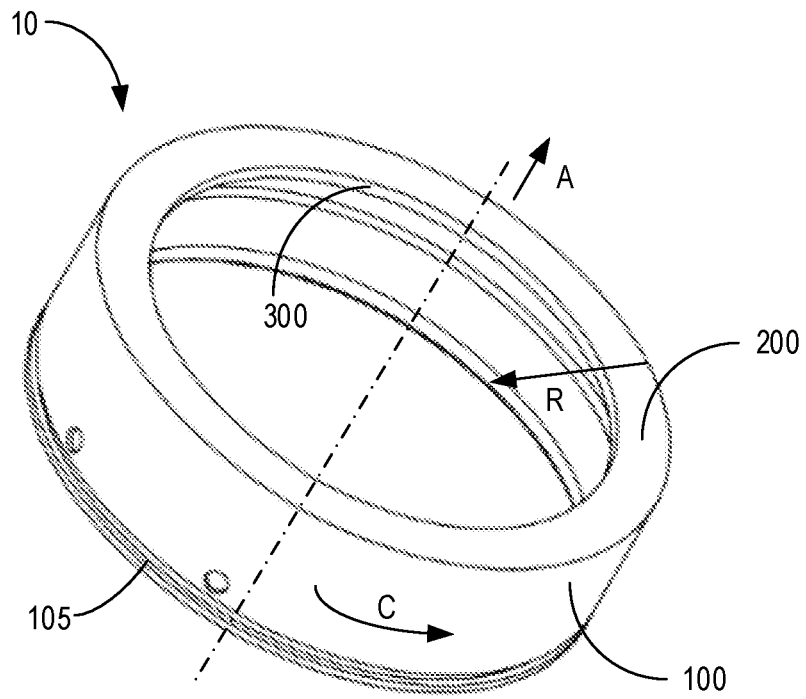
FIG. 10 shows a schematic perspective view of the ring seal in FIG. 9.
Figure 11:
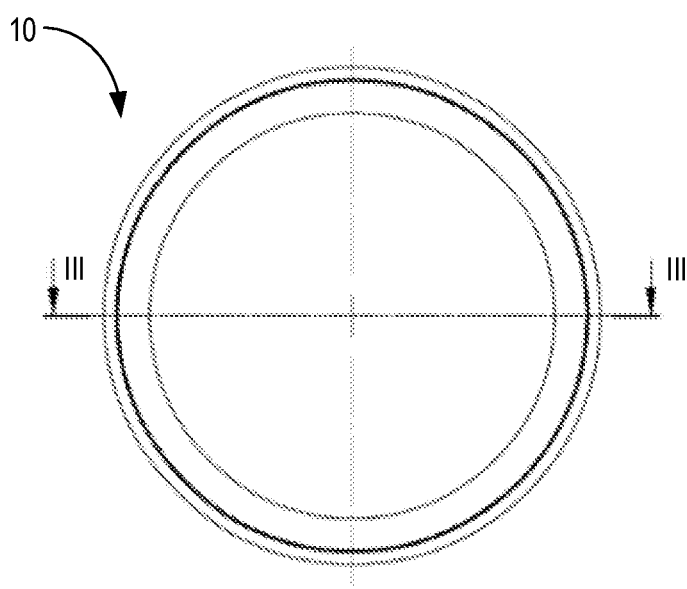
FIG. 11 shows a front view of the ring seal in FIG. 10.

In some embodiments, as shown in FIG. 2, FIG. 6 or FIG. 10, the outer circumferential wall 100 may be provided with a circumferential groove 105 extending in the circumferential direction C on a side away from the annular portion 200. In this way, the circumferential groove 105 may accommodate an O-ring. The O-ring may also function to seal in the robot. The design of the circumferential groove 105 may achieve the combination of the ring seal 10 and the O-ring, which helps to further inhibit seepage of the oil.

In some embodiments, the ring seal 10 may be made of aluminum or steel. It is to be understood that the ring seal 10 may also be made of materials in addition to the materials listed herein, as long as such materials may meet the working performance requirements and sealing requirements of the ring seal 10. Specific materials are not limited by embodiments of the present disclosure.

In some embodiments, the outer circumferential wall 100 extends by a first length L1 in the axial direction A, the inner circumferential wall 300 extends by a first length L2 in the axial direction A, and the first length L1 may be greater than the second length L2. In this way, the ring seal 10 may be better received in the robot, so that the space inside the robot may be used more rationally.

In some embodiments, the annular portion 200 may be perpendicular to the outer circumferential wall 100. In this way, the ring seal 10 may be made easier to manufacture, thereby saving production costs. In addition, such a design may make the ring seal 10 suitable for more types of robots, and its application range may be expanded.

The embodiment of the present disclosure relates to a robot. The robot includes a gear box 20 and the ring seal 10 described above. Referring to FIG. 1, FIG. 5 or FIG. 9, the ring seal 10 is disposed radially outside the gear box 20. The outer circumferential wall 100 of the ring seal 10 is fixedly connected to an end 21 of the gear box 20, and there is a gap G between the annular portion 200 of the ring seal 10 and the other end 22 of the gear box 20 in the radial direction R.

In this way, it may be ensured that the oil in the robot will not seep. In addition, the gap G may ensure that there is no contact between the ring seal 10 and the other end 22 of the gear box 20, thereby avoiding the generating of extra friction. In this way, through this non-contact seal, the sealing effect in the robot may be improved in a low-cost manner. Due to the good sealing effect, the seeped grease may be well protected to avoid pollution to the working environment. The amount of grease in the gearbox may be allowed to be added to a higher level, without worrying about the seepage caused by excessive grease.

According to an embodiment of the present disclosure, effective sealing in the robot may be achieved only by providing a specific form of ring seal 10 in the robot. As compared with conventional sealing means, the seal ring according to the embodiments according to the present disclosure is not only easy to assemble and controllable in cost, but also may make reasonable use of the space in the robot without adding additional problems to the normal use of the robot.

Although the claims in this application are drafted for specific combinations of features, it should be understood that the scope of the present disclosure also comprises any novel feature or any novel combination of features disclosed herein, explicitly or implicitly, or any generalization thereof, regardless of whether it involves the same solution in any of the claims currently claimed.

We claim:

1. A ring seal, comprising:
   an outer circumferential wall extending in an axial direction of the ring seal;
   an annular portion extending at a right angle from a side of the outer circumferential wall towards an interior of the ring seal from the outer circumferential wall in a radial direction of the ring seal,
   an inner circumferential wall extending in the axial direction at a right angle from an end of the annular portion parallel to and spaced apart by a gap from the outer circumferential wall, wherein the inner circumferential wall, the outer circumferential wall and the annular portion form a U shape when viewed in a cross section taken along the radial direction,
   wherein the annular portion and the outer circumferential wall form an L shape when viewed in a cross section taken along the radial direction,
   the outer circumferential wall comprises a first portion and a second portion arranged and aligned collinearly in the axial direction,
   the first portion is close to the annular portion and has a first thickness in the radial direction,
   the second portion has a second thickness in the radial direction, and
   the second thickness is greater than the first thickness so that a slope is formed on a radially inner side of the outer circumferential wall.

2. The ring seal of claim 1, wherein the outer circumferential wall is provided with a circumferential groove extending in a circumferential direction on a side away from the annular portion.

3. The ring seal of claim 1, wherein the ring seal is made of aluminum or steel.

4. The ring seal of claim 1, wherein the outer circumferential wall extends by a first length in the axial direction, the inner circumferential wall extends by a second length in the axial direction, and wherein the first length is greater than the second length.

5. The ring seal of claim 1, wherein the annular portion is perpendicular to the outer circumferential wall.

6. A robot, comprising:
   a gear box; and
   the ring seal of claim 1, the ring seal being disposed on a radially outer side of the gear box, wherein the outer circumferential wall of the ring seal is fixedly connected to an end of the gear box, and there is a gap disposed between the annular portion of the ring seal and the other end of the gear box in the radial direction.

* * * * *